United States Patent [19]

Singer, Jr.

[11] 4,385,092
[45] May 24, 1983

[54] MACROBOULE

[75] Inventor: Joseph Singer, Jr., Arlington Heights, Ill.

[73] Assignee: Ni-Tec, Inc., Niles, Ill.

[21] Appl. No.: 490,784

[22] Filed: Sep. 24, 1965

[51] Int. Cl.³ .............................................. B32B 3/20
[52] U.S. Cl. .................................... 428/188; 65/4.21;
65/4.3; 65/36; 313/105 CM; 313/103 CM;
428/212; 428/398
[58] Field of Search .......... 88/1 LCR; 65/DIG. L R,
65/4, 4.21, 4.3, 36, 108; 313/104 R, 104 CM,
105 R, 105 CM; 428/188, 212, 398

[56]   References Cited
U.S. PATENT DOCUMENTS 2,608,722  9/1952  Stuetzer .
3,275,428  9/1966  Siegmund .

Primary Examiner—Harold J. Tudor
Attorney, Agent, or Firm—Cook, Wetzel & Egan

[57] ABSTRACT

A macroboule is disclosed, formed of a bundle of hollow channel elements of fusible material and of different internal diameters. They are arranged with the elements of smallest diameter positioned in the center of the bundle and those of largest internal diameter constituting the outer row of the bundle with uniform or step by step graduation between these extremes. The macroboule is useful for forming a channel multiplier.

4 Claims, 1 Drawing Figure

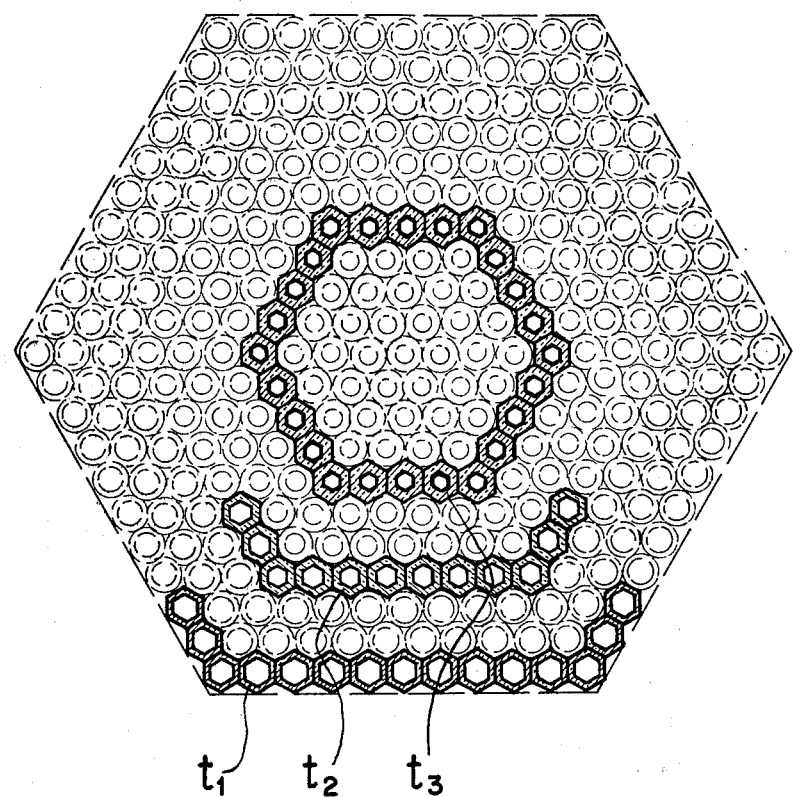

MACROBOULE

The present invention concerns a modified macroboule structure especially useful in the fabrication of channel multiplier plates.

A channel multiplier plate is usually made by assembling a large number of macroglass tubing or channel elements into a hexagonal macroboule. This may be accomplished by forming a bundle of hollow channel elements within a mold of hexagonal cross section. The channel elements themselves may be round or hexagonal in cross section and may be made of glass that is rich in metallic oxide such as lead oxide. Heat treating the bundle of channel elements while contained within the mold permits their being fused into a macroboule unit of hexagonal cross section. The macroboule is inserted into a vertical oven and the temperature raised to the softening point of the glass and drawing or pulling of the softened glass reduces the macroboule in cross sectional dimension by at least an order of magnitude, forming what is known in the art as a microbundle. If the diameter of the channel elements of the macroboule is of the order of 0.125 inches, the diameter in the microbundle may be approximately 0.002 inches.

A number of such microbundles may again be assembled to form a larger unit referred to as a microboule which is similarly treated in a vertical oven and pulled or stretched to arrive at a so-called microboule of second order which may be sliced into microhcannel plates. Processes for forming the macroboule, the microbundle and the microboule are described in a copending application of Joseph Singer, Jr., Ser. No. 482,327, filed Aug. 20, 1965, and assigned to the assignee of the present invention now U.S. Pat. No. 4,127,398.

It has been found through experience that the cross sectional configuration of the macroboule is retained in the pulling process so that the microbundle, while of reduced dimension, has essentially the same cross sectional configuration as the starting component. It has been determined, however, that the diameter of the channel elements in the microbundle may vary with radial distance from the center of the bundle, specifically, the diameter tends to decrease with radial spacing. This reduction in channel diameter is most pronounced if the shrinking ratio during pulling is increased even if the temperature distribution in the oven is quite uniform. If such a change in diameter is experienced in forming the microbundle, it tends because of the surface tension of glass to be further accentuated in the remaining processing steps leading to the formation of the microboule of the first and second order.

It may be shown that the variation in diameter of the channel elements adversely affects the uniformity of gain of the multiplier. Specifically, the gain of an individual channel element in a channel multiplier plate is determined by or varies with the ratio of the channel length to channel diameter for any given excitation potential applied across the plate. Where the aforedescribed variation in channel diameter results from the forming process, the peripheral elements of any microbundle will under normal operating condition have less gain at a given voltage than the elements that are more centrally located. Because of this variation in gain, an image translated through a microchannel plate made from a mosaic or pattern of slices from such microbundles exhibits less brightness at the boundaries where the slices of the microboule meet. This phenomenon is referred to as fixed pattern noise and is undesirable.

Accordingly, it is an object of the present invention to provide an improved macroboule structure for use in fabricating channel multipliers with improved fixed pattern noise properties.

It is a specific object of the invention to provide a novel macroboule structure from which there may be prepared channel multipliers having a substantially reduced fixed noise pattern.

It is another very specific object of the invention to provide a novel macroboule structure for the preparation of drawn fibre bundles characterized by substantially uniform diameter of its fibre elements.

A macroboule structure in accordance with the invention and especially useful in the manufacture of channel multiplier plates comprises a bundle of hollow channel elements of fusible material. The channel elements are characterized by different internal diameters and are arranged within the bundle with the elements of smallest inside diameter positioned in the center of the bundle while the elements of largest inside diameter constitute the outermost peripheral rows of the bundle. Theoretically, best results are obtained by having a uniform change in elemental diameter from the largest diameter at the outermost periphery of the bundle to the smallest diameter at the center. A more practical application of the invention, however, contemplates that the elemental channel diameter variations occur in steps.

The features of the present invention which are believed to be novel are set forth with particularity in the appended claims. The invention, together with further objects and advantages thereof, may best be understood by reference to the following description taken in connection with the accompanying drawing, the single FIGURE of which represents a plan view of a novel macroboule structure in accordance with the invention.

As stated above, appropriate mechanisms for forming macroboules, microbundles, microboules and even channel multiplier plates are described in the aforementioned application which is incorporated herein by reference. The present invention is addressed to a unique macroboule structure which, when processed in accordance with the teachings of the aforementioned application, yields microbundles and microboules and from them channel multiplier plates characterized by essentially uniform diameter of the individual channel elements. Accordingly, it is sufficient to describe the macroboule structure in order to understand the subject invention.

As shown in the FIGURE, the macroboule structure is hexagonal in cross section and is formed of a multiplicity of similar hollow or fibre channel elements of fusible material arranged in a bundle. The elementary channels may, for example, be fibres of lead oxide glass such as Corning Type 8161. The individual channels may be circular but preferably are hexagonal in cross section. They have the same outside diameter but different wall thicknesses and are arranged into the bundle of FIG. 1 by being stacked within a mold of hexagonal cross section. The bundles are arranged in concentric rows and the wall thickness varies from a minimum value in the outermost rows to a maximum in the innermost row or at the center of the bundle.

More particularly, in one embodiment of the invention each of the fibres or channel elements has an outside diameter of ⅛ inch and the two peripheral rows have a thickness $t_1$ of approximately 0.012 inch. The next two or three concentric rows closer to the center of the bundle have a wall thickness $t_2$ which may be 0.020 inch. The next two or three rows toward the center of the bundle may have a wall thickness of 0.025 inch. This step-type increase in wall thickness may be continued to the center of the bundle although as a practical matter sufficient uniformity of channel diameter may be realized with the three-step thickness variation recited above as illustrative of a macroboule structure with an outside diameter of its fibre elements of ⅛ inch.

Arranging the fibre elements in concentric rows within the hexagonal mold results in the structure illustrated in the FIGURE, differing from prior structures in that channel elements of the smallest internal diameter are positioned in the center of the bundle while the internal diameter of the elements increases with radial spacing. Hence, the elements in the peripheral rows have the largest inside diameter which, since all elements have the same external diameter, is achieved by a decreasing wall thickness from the center to the periphery of the bundle.

The described structure may be integrated into a single unitary assembly by placing the charged mold into a suitable oven where the charge is heated to the softening temperature to fuse the fibre elements together. Preferably, this is accomplished as described in the above-identified application in a way which eliminates pockets or voids between the fibre elements so that the resulting structure may be likened to a body of bulk material having a multiplicity of channels extending from one face clear through to the other.

Such a macroboule structure is then fed into a vertically disposed oven and heated to a drawing temperature to be drawn into a microbundle by pulling, all as described in the aforementioned copending application. Where the fibre elements have weighted wall thicknesses so that the inside channel diameter varies from a maximum at the outer periphery at the macroboule to a minimum in its center, the change in channel diameter introduced by the pulling or drawing process is compensated. In short, the elements at the outer periphery of the bundle undergo the greatest reduction in diameter in the drawing step but since they initially have the largest diameter of the bundle a condition of desired or controlled channel diameter is established in the drawn microbundle. By virtue of a controlled, and preferably uniform, channel diameter in the microbundle, the processing may continue to the formation of a channel multiplier plate characterized by channels of essentially uniform diameter and freedom from fixed pattern noise.

Another approach to the problem of eliminating fixed pattern noise through uniform diameter of the channel elements in the multiplier plate is the subject of an application, Ser. No. 490,782, filed concurrently herewith in the name of Ronald Schulman and assigned to the assignee of the present invention, now U.S. Pat. No. 3,990,874. The Schulman approach features a pressure differential within the macroboule during the drawing step. In particular, a fluid pressure is established in the outermost channel elements that is high compared to the fluid pressure of the innermost elements and the pressure gradient is adjusted to the end that the microbundle exhibits substantially uniform diameter of its channel elements.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A macroboule for use in forming a channel multiplier comprising:
    a bundle of hollow channel elements of fusible material and of different internal diameters arranged with the elements of smallest diameter positioned in the center of the bundle and with the elements of largest internal diameter constituting the outermost peripheral row of the bundle.

2. A macroboule for use in forming a channel multiplier comprising:
    a plurality of concentric rows of hollow channel elements of fusible material with the internal diameter of said elements decreasing from a maximum at the outermost rows to a minimum at innermost row.

3. A macroboule for use in forming a channel multiplier comprising:
    a plurality of concentric rows of hollow channel elements of fusible material having the same outside diameter but a wall thickness that varies from a minimum value in the outermost rows to a maximum in the innermost row.

4. A macroboule for use in forming a channel multiplier comprising:
    a plurality of concentric rows of hollow channel elements of fusible material having the same outside diameter but a wall thickness that varies in discrete steps from a minimum value in the outermost rows to a maximum in the innermost row.

* * * * *